United States Patent [19]

Wong et al.

[11] Patent Number: 4,612,155

[45] Date of Patent: Sep. 16, 1986

[54] PROCESS FOR THE GRAFTING OF MONOMERS ONTO POLYOLEFINS

[75] Inventors: Chun S. Wong; Ronald A. Zelonka, both of Kingston, Canada

[73] Assignee: Du Pont Canada Inc., Mississauga, Canada

[21] Appl. No.: 756,176

[22] Filed: Jul. 18, 1985

[51] Int. Cl.$^4$ .................... C08L 51/06; C08L 23/26
[52] U.S. Cl. .................... 264/176 R; 264/171; 264/211; 264/349; 525/74; 525/78; 525/177; 525/184; 525/193; 525/196; 525/197; 525/194; 525/207; 525/221; 525/222; 525/239; 525/240
[58] Field of Search .................... 525/193, 74, 78, 177, 525/184; 264/176 R

[56] References Cited

U.S. PATENT DOCUMENTS

| | | | |
|---|---|---|---|
| 3,868,433 | 2/1975 | Bartz et al. | 525/193 |
| 3,966,672 | 6/1976 | Gaylord | 525/207 |
| 4,234,656 | 11/1980 | Amenbal et al. | 525/194 |

Primary Examiner—Carman J. Seccuro

[57] ABSTRACT

A continuous process for the grafting of ethylenically unsaturated monomers onto homopolymers of ethylene and copolymers of ethylene and $C_4$-$C_{10}$ higher alpha-olefins is disclosed. The process involves feeding to an extruder an admixture comprising (i) a major portion of the above polymer of ethylene, (ii) the monomer, (iii) 25-500 ppm of an organic peroxide and (iv) a minor portion of a normally solid thermoplastic polymer having a melting point of less than 185° C. and a shear viscosity at 200° C. and a shear rate of 400 sec$^{-1}$ that is not more than 50% of that of the polymer of ethylene. The organic peroxide is in the form of a composition with the thermoplastic polymer. The admixture is mixed in a first zone at a temperature above the melting point of the polymers for at least ten seconds but for less than 25% decomposition of the peroxide and then in a second zone for a period that is at least four times the half-life of the peroxide. A grafted polymer having a melt index that is 20-100% of that of the polymer prior to grafting is obtained. The grafted polymer may be used in a variety of end-uses, for example, the manufacture of film, moulding of articles, extrusion coating of metals and coextrusion processes.

24 Claims, No Drawings

PROCESS FOR THE GRAFTING OF MONOMERS ONTO POLYOLEFINS

BACKGROUND OF THE INVENTION

1. Field of the Invention

The present invention relates to a continuous process for the grafting of ethylenically unsaturated monomers onto polyolefins and especially to the grafting of ethylenically unsaturated carboxylic acids and anhydrides onto homopolymers of ethylene and copolymers of ethylene and higher alpha-olefins.

2. Description of the Art

Polymers of alpha-olefins in which the alphaolefin is a hydrocarbon are well known. Since polymers, especially homopolymers of ethylene and copolymers of ethylene with $C_4$–$C_{10}$ alpha-olefins, are used in large volumes for a variety of end-uses e.g. in the form of fibres, films, moulded articles and the like.

Polyolefins are relatively non-polar, which is an important and beneficial characteristic for many end-uses. However, in some instances the non-polar nature of polyolefins may be a disadvantage. For instance, polar additives have a tendency to exude from polyolefins and it is usually necessary to treat polyolefins to promote adhesion to adhesives and printing inks.

It is known that the properties of polyolefins may be modified by the grafting of ethylenically unsaturated carboxylic acids and anhydrides onto hydrocarbon polyolefins. In U.S. Pat. No. 2,973,344, which issued Feb. 28, 1961 E. V. Fasce describes the grafting of unsaturated alpha-beta dicarboxylic acid anhydrides onto low pressure polyalkene polymers, including grafting in the absence of solvent at 121°–204° C. W. C. L. Wu et al. describe the grafting of cyclic ethylenically unsaturated carboxylic acids and anhydrides onto polyethylene, under melt conditions and in the presence of t-butyl hydroperoxide, including the grafting of maleic anhydride on to polyethylene in a comparative example, in U.S. Pat. No. 3,873,643, which issued Mar. 25, 1975 R. A. Steinkamp et al describe, in Canadian Pat. No. 993,592 which issued July 20, 1976, a process for modifying the rheological or chemical and rheological properties of a polymer (polypropylene) by injecting a modifier and/or a free radical initiator into molten polymer in an intense mixing and reaction zone within an extruder; shear degradation of the polymer occurs. A process which comprises mixing polyethylene under melt conditions at 140°–210° C. with an ethylenically unsaturated polycarboxylic acid anhydride modifier is described in Canadian Pat. No. 1,109,183 of R. T. Swiger et al., which issued Sept. 15, 1981. The grafting of fumaric acid diester onto polyethylene, preferably at 270°–320° C., is described in Canadian Pat. No. 867,818 of R. J. Zeitlin, which issued Apr. 6, 1976. Such processes tend to use relatively high levels of organic peroxide in the grafting process.

SUMMARY OF THE INVENTION

Accordingly, the present invention provides a continuous process for the grafting onto a polyolefin of an ethylenically unsaturated monomer that is capaable of reacting with said polyolefin in a molten condition, said polyolefin being selected from the group consisting of homopolymers of ethylene and copolymers of ethylene and $C_4$–$C_{10}$ higher alpha-olefins, and mixtures thereof, said process comprising:

(i) feeding a physical admixture to an extruder equipped with a mixing screw, said physical admixture being comprises of (a) a major portion of particles of a polyolefin, (b) a minor portion of particles of a second polymer, (c) said monomer and (d) 25–500 ppm of an organic peroxide having a half life of from about one minute to about 120 minutes at 150° C., said polyolefin being the polyolefin defined above and said second polymer being a normally solid thermoplastic polymer having a melting point of less than 185° C. and a shear viscosity that is not more than 50% of that of said polyolefin when measured at 200° C. and a shear rate of 400 $sec^{-1}$, said organic peroxide being in the form of a composition with the second polymer, (ii) mixing said admixture in a first zone of the extruder at a temperature above the melting point of said polyolefin and second polymer for a period of time such that the amount of decomposition of the organic peroxide is less than about 25%, said period of time being at least ten seconds, (iii) mixing the resultant admixture in a second zone of the extruder at a temperature above the melting point of the polyolefin and second polymer for a period of time that is at least four times the half-life of the peroxide, and (iv) extruding the grafted polymer so obtained into a shaped article.

In a preferred embodiment of the process of the present invention, the monomer is selected from the group consisting of ethylenically unsaturated carboxylic acids, ethylenically unsaturated carboxylic acid anhydrides, and mixtures thereof.

In another embodiment, the temperature of the admixture in the second zone is higher than the temperature of the admixture in the first zone of the extruder.

In a further embodiment, the monomer is maleic anhydride.

The present invention also provides a grafted polyolefin comprising a polyolefin having 0.1–5% by weight of a monomer grafted thereon, said polyolefin being selected from the group consisting of homopolymers of ethylene and copolymers of ethylene and $C_4$–$C_{10}$ higher alpha-olefins, and mixtures thereof, and said monomer being an ethylenically unsaturated monomer that is capable of reacting with said polyolefin in a molten condition, said grafted polyolefin having a melt index that is 20–100% of the melt index of the polyolefin prior to grafting, said grafted polyolefin having been formed by grafting of monomer onto molten polyolefin in the presence of 25–500 ppm of an organic peroxide.

In a preferred embodiment of the grafted polyolefin of the present invention, the monomer is selected from the group consisting of ethylenically unsaturated carboxylic acids, ethylenically unsaturated carboxylic acid anhydrides, and mixtures thereof.

DETAILED DESCRIPTION OF THE INVENTION

It is important in the grafting of monomers onto polyolefins that a uniform product be obtained. If the grafting process is not carried out in a uniform manner, the resultant product may exhibit variable, and unacceptable, properties especially with respect to adhesion to metals and polymers. Moreover, it is important to be able to graft monomers onto polyolefins without causing major changes to the physical properties of the polymer.

A process has now been found for the grafting of ethylenically unsaturated monomers, especially carboxylic acids and anhydrides, onto polymers of ethylene in the presence of low level so organic peroxide that results in relatively small changes in the physical properties of the polymer.

The polyolefin of the admixture fed to the extruder may be a homopolymer of ethylene and/or a copolymer of ethylene with at least one $C_4$–$C_{10}$ higher alpha-olefin, especially copolymers of ethylene with butene-1, hexene-1 and/or octene-1.

The density of the polymers will depend to a large extent on the intended end-use of the grafted polymers obtained from the process. However, in embodiments, the density may range from about 0.890 g/cm$^3$ to about 0.970 g/cm$^3$ and the melt index, as measured by the procedure of ASTM D-1238 (condition E), may range up to about 200 dg/min. For example, polymers intended for film and sheet end-uses tend to have melt indices of less than about 10 dg/min. whereas polymers intended for moulding end-uses tend to have higher values of melt index. The ranges of density and melt index of polyolefins useful for various types of products will be understood by those skilled in the art.

The characteristics of the second polymer differ from those of the polyolefin in that the second polymer has a shear viscosity that is not more than 50% of the shear viscosity of the polyolefin. As used herein, shear viscosity is determined at 200° C. at a shear rate of 400 sec$^{-1}$. In embodiments, the shear viscosity of the second polymer is not more than 30% of that of the polyolefin, and especially 5–15% of that of the polyolefin.

The second polymer is a normally solid thermoplastic polymer and may include materials frequently referred to as solid waxes but does not include materials that are liquids at ambient temperatures and pressures; the blends are physical admixtures and are therefore capable of separation into the respective components at ambient temperatures.

In preferred embodiments, the second polymer is selected from the group consisting:

A. homopolymers and copolymers of unsaturated hydrocarbons;

B. copolymers of an alpha-olefin having the formula R—CH=CH$_2$, where R is a radical selected from the class consisting of hydrogen and alkyl radicals having from 1 to 8 carbon atoms, with alpha,beta-ethylenically unsaturated acids having from 3 to 8 carbon atoms, and esters and anhydrides thereof, such acids being mono-, di, or polycarboxylic acids, the moieties being randomly or non-randomly distributed in the polymer chain and being 0.5–50% by weight of the copolymer, any other copolymerized monomer being monoethylenically unsaturated;

C. ionomeric polymers derived from the copolymers of (B);

D. graft copolymers obtained by grafting 0.1 to 5 percent by weight of alpha-beta unsaturated carboxylic acids having 3 to 8 carbon atoms or an unsaturated carboxylic acid anhydride onto a preformed backbone derived from ethylene or ethylene and $C_3$ to $C_8$ alpha-olefin, in which polyolefin backbone any other optionally copolymerized monomer component is monoethylenically unsaturated;

E. homopolymers of R'—CH=CH—R' where each R' is independently selected from the group consisting of H, Cl and F, with the proviso that at least one R' is other than H, copolymers of ethylene with R'—CH=CH—R' and chlorinated homopolymers and copolymers of $C_2$–$C_{10}$ hydrocarbon alpha-olefins;

F. saturated polyamides and polyesters;

G. homopolymers of vinyl esters of aliphatic carboxylic acids having 3 to 8 carbon atoms, copolymers of ethylene with such esters, and partially saponified polymers thereof; and H. copolymers of (B) in which all or part of the alpha-olefin has been replaced with styrene or alkyl styrene, where the alkyl group has 1 or 2 carbon atoms.

In particularly preferred embodiments, the second polymer is selected from the group consisting of homopolymers and copolymers of hydrocarbon alpha-olefins having 2–10 carbon atoms. For instance the homopolymers may be homopolymers of ethylene, propylene and butene-1, and the copolymers may be copolymers of ethylene with $C_3$–$C_{10}$ higher alpha-olefins, especially copolymers of ethylene with butene-1, hexene-1 and/or octene-1. Preferably, the second polyolefin is a homopolymer of ethylene and/or a copolymer of ethylene and a $C_4$–$C_{10}$ higher alpha-olefin.

In alternative embodiments, the polymer is selected from the group consisting of:

(i) ethylene/propylene elastomers, especially such elastomers that are known as EPDM rubbers, e.g. Nordel* elastomers;

(ii) polystyrene, e.g. Polysar* polystyrene;

(iii) block copolymers e.g. styrene/butadiene/styrene copolymers, e.g. Kraton* elastomers;

(iv) ethylene/acrylic acid or ethylene/methacrylic acid copolymers, e.g. Nucrel* copolymers;

(v) ethylene/vinyl acetate copolymers e.g. Elvax* copolymers; and (vi) ionomeric polymers derived from ethylene/acrylic acid or ethylene/methacrylic acid copolymers e.g. Surlyn* ionomers.

\* denotes trade mark

The physical admixtures fed to the extruder contain an organic peroxide, which as used herein includes hydroperoxides, especially a bis(tert. alkyl peroxy alkyl) benzene, dicumyl peroxide, or acetylenic diperoxy compound. Other organic peroxides are known to those skilled in the art, including t-butyl hydroperoxide and di-t-butyl peroxide. The organic peroxides used in the process of the present invention have a half-life at 150° C. of from about one minute to about 120 minutes. 2,5-Dimethyl-2,5 bis(tert. butyl peroxyisopropyl)benzene is a preferred organic peroxide and is available commercially under the trade mark Vulcup from Hercules Incorporated. Another preferred organic peroxide is 2,5-dimethyl-2,5-di(t-butylperoxy)hexyne-3 which is available commercially under the trade mark Lupersol 130 from Lucidol Division of Pennwalt Corporation. The organic peroxide in the admixture fed to the extruder is in the form of a composition with the second polymer.

A co-curing agent may be incorporated into the polyolefin of the second polymer i.e. either separately from or admixed with the organic peroxide. Examples of co-curing agents include triallyl cyanurate, triallyl isocyanurate and 1,2-polybutadiene.

The physical admixtures fed to the extruder also contain a monomer that is ethylenically unsaturated and which is capable of reacting with molten polyolefin, especially in the presence of an organic peroxide. In preferred embodiments, the monomer is selected from the group consisting of ethylenically unsaturated carboxylic acids and ethylenically unsaturated carboxylic acid anhydrides, derivatives of such acids and ethylenically unsaturated hydrocarbons with other functional groups. Examples of the acids and anhydrides, which may be mono-,di- or polycarboxylic acids, are acrylic acid, methacrylic acid, maleic acid, fumaric acid, itaconic acid, crotonic acid, itaconic anhydride, maleic anhydride and substituted maleic anhydride e.g. dimethylmaleic anhydride. Examples of the derivatives of the unsaturated acids are salts, amides, imides and esters e.g. mono- and disodium maleate, acrylamide, maleimide and diethyl fumarate. Examples of ethylenically unsaturated hydrocarbons with other functional groups are vinyl pyridines, vinyl silanes and unsaturated alcohols e.g. 4-vinyl pyridine, vinyltriethoxysilane and allyl alcohol.

The ratio of the polyolefin to the second polymer may be varied over a wide range, particularly from about 5:1 to about 400:1, especially 10:1 to 100:1. The ratio selected will depend on a variety of factors, including the amount of organic peroxide and monomer to be incorporated into the blend, the mixing capabilities of the apparatus and the like. With regard to the mixing capabilities of the apparatus, twin-screw extruders may be more effective than single screw extruders.

The amount of organic peroxide will depend in particular on the characteristics of the polyolefin but will be in the range of 25–500 ppm, especially 25–400 ppm, based on the weight of polyolefin in the admixture fed to the extruder, and particularly in the range of 50–200 ppm. For example, a high density homopolymer of ethylene having a narrow molecular weight distribution will likely require less organic peroxide than will a low density ethylene/alpha-olefin copolymer having a broad molecular weight distribution in order to achieve the same effects. It is an important characteristic of the present invention that low levels of organic peroxide may be used, while still effecting high degrees of grafting. Such low levels result in relatively small changes in the properties of the polyolefin, especially relatively small changes in the melt index thereof on extruding the polyolefin admixture.

The amount of organic peroxide may also depend on the amount and nature of any additives in the polyolefin and polymer. For example, the additives may include a stabilizing agent e.g. an antioxidant or an ultra violet stabilizer. Examples of antioxidants are hindered phenolic antioxidants e.g. octadecyl-3,5-di-tert.- butyl-4-hydroxy cinnamate and tetrakis-methylene-3-(3',5'-ditert.butyl-4-hydroxyphenyl) propionate methane. Hindered phenolic antioxidants may be used in combination with a phosphite antioxidant e.g. di(stearyl)pentaerythritol diphosphite, tris di-tert.-butyl phenyl phosphite, dilauryl thiodipropionate and bis(2,4tert.butylphenyl) pentaerythritol diphosphite. Examples of ultra violet stabilizers are 2-hydroxy-4-n-octoxybenzophenone, 2-(3'-tert.butyl-2'-hydroxy-5'-methylphenyl)-5-chloro benzotriazole and bis-(2,2,6,6,-tetramethyl-4-piperindyl)sebacate. Moreover, the additives may include slip agents, anti-blocking agents, anti-static agents, mould release agents, pigments, nucleating or other processing aids or the like. Example of slip agents are erucamide and stearamide, of anti-static agents are bis(hydroxyethyl) tallow amine and glycerol monooleate, of anti-blocking agents are silica and mica and of mould release agents are calcium stearate and zinc stearate. Examples of nucleating agents or other processing aids are talc, silica, polyethylene glycol, fluorinated elastomers and polyolefin waxes, or the like.

As noted above, stabilizing or other so-called nonreactive agents may have detrimental effects on the grafting process and for that reason it may be preferable not to use certain combinations of agents, as will be understood by those skilled in the art.

The amount of monomer will depend in particular on the reactivity of the monor and the level of grafting that is to be achieved. For example, if the monomer is maleic anhydride, the amount of monomer may be as high as about 5%, especially 0.1–2%, based on the weight of the polyolefins, and particularly in the range of 0.2% to 1.5%. With other monomers, different ranges of the amounts of monomer may be preferred.

The organic peroxide is in the form of a composition with the second polymer. The monomer may be in the form of a powder in the admixture and/or a coating on or a blend with the polyolefin. It is, however, preferred that both the organic peroxide and monomer are in the form of compositions with the second polymer. Such compositions may be in the form of a coating of peroxide and/or monomer on the second polymer or a blend with the second polymer, or a combination thereof. The organic peroxide may be as a composition with the second polymer and the monomer may be as a composition with another second polymer, the polymers being the same or different. Techniques for forming compositions of organic peroxide and/or monomer with the second polymer, as coatings and/or blends or the like, are known in the art. Such methods include melt blending, coating and extrusion, and injection of the agent into the molten polyolefin and solidification of the resultant blend. The organic peroxides and monomer should be formed into the composition with the second polymer in a manner that does not result in premature reaction of organic peroxide and/or monomer with the second polymer or, if combined, with each other.

The particles of the polyolefin and second polymer may be any convenient shape and size and may for example be granules, powder, pellets or the like. Such forms are commercially available forms of polymers and/or may be obtained by known techniques e.g. grinding, melt pelletization and the like. However, it is preferred that the particles of the polyolefin be of substantially the same size as the particles of the composition of organic peroxide and second polymer. As the difference in size between the particles increases, so does the possibility that the two types of particles will become separated from one another during storage, transportation or other handling of the blend; such differences may be less critical if the blend is fed to an extruder shortly after preparation thereof.

In the process of the present invention, the physical admixture is fed to an extruder, the process being operated as a continuous process. The extruder should be equipped with a mixing screw. In a first zone of the extruder, the admixture is admixed for at least two seconds at a temperature above the melting point of the polyolefin and second polymer. During this period of mixing, which occurs in a mixing zone in the extruder, the amount of decomposition of the organic peroxide should be less than about 25% thereof; information on the rate of decomposition of organic peroxides at various temperatures is available e.g. from the supplier of the organic peroxide, or may be determined by those skilled in the art, and may be used in the selection of the organic peroxide and/or the temperature profile in the extruder. It is important that the amount of decomposition be low so that mixing of the components of the admixture is achieved prior to substantial decomposition of the organic peroxide and the resultant grafting of monomer onto the polyolefin.

The resultant polymer admixture in the extruder is then further heated in a second zone for a period of time that is at least four times the half-life of the organic peroxide. Preferably the temperature of the polymer admixture in the second zone is in the range of 195°–280° C. and especially 210°–260° C.

As will be appreciated by those skilled in the art, single and twin screw extruders often have multiple heating zones. The first and second zones referred to herein may encompass more than one such zone but the first and second zones herein would be in combination normally substantially or fully encompass all of the heating zones of an extruder.

While the hold-up time of the polymer in the extruder will depend on a number of factors, including the particular extruder being used and the rate of extrusion, it is preferred that the hold-up time of the polymer in the extruder be less than two minutes.

The use of admixtures containing a second polymer with lower shear viscosity than the polyolefin permits the manufacture of commercially acceptable products in a continuous process, using low levels of organic peroxide, to give a balance of properties not readily attainable by the other means, especially grafting of monomer with minimal cross-linking or shear degradation of the polyolefin. In particular, the invention provides a method of preparing grafted polyolefins in which the grafted polymer has a melt index of 20–100% of that of the polyolefin prior to grafting, especially 30–60% thereof. The invention also provides a method for grafting monomers onto polyolefin with high grafting yield. For example, under favourable circumstances, especially low levels of antioxidant in the polyolefin, with 1% maleic anhydride, the grafting yield can be 50–90%.

The process of the present invention may be used to produce compositions of monomer grafted onto polyolefins. The shaped articles produced by the process of the invention will usually be pellets or other comminuted shapes, but other shaped articles may be produced by the process of the invention. The resultant grafted polyolefins may be used as such, or as blends with other polymers, especially to improve adhesion of polyolefins to other materials, improve dye receptivity, compatibility with and/or retention of other materials e.g. additives, in polyolefin or the like. The grafted polyolefins may be used in a wide variety of end-uses, including manufacture of film, moulding into articles, extrusion coating of metals and coextrusion processes, or the like.

The present invention is illustrated by the following examples:

Unless specified otherwise, in order to measure the adhesion of a polymer sample to aluminum, a sample of film 75-125 m in thickness was dried in a vacuum oven at 100°–110° C. and under a purge of nitrogen for at least 12 hours. The film thus dried was bonded to aluminum foil that had been cleaned with cyclohexane and then acetone, followed by air drying for 10 minutes. The bond was formed on a Sentinel* heat sealer equipped with a 2.5 cm wide bar using a jaw pressure of 4.2 kg/cm², a jaw temperature of 180° C. and a dwell time of one second. Adhesion was measured according to the T-peel test described in the procedure of ASTM D1876-72; the average of six samples is reported.

* denotes trade mark

All parts, percentages and proportions are by weight unless otherwise indicated.

EXAMPLE I

An admixture was prepared by mixing 10 g of maleic anhydride powder with 900 g of SCLAIR* 11K-1 polyethylene and with 100 g of SCLAIR 2114 polyethylene containing Lupersol 130 organic peroxide. The concentrations of peroxide and maleic anhydride were 250 ppm and 1.0% respectively. SCLAIR 11K-1 polyethylene is an ethylene/butene-1 copolymer having a density of 0.920 g/cm³ and a melt index of 1.4 dg/min. SCLAIR 2114 polyethylene is an ethylene/butene-1 copolymer having a density of 0.924 g/cm³ and a melt index of 53 dg/min.

* denotes trade mark

The resultant admixture was extruded, according to the process of the invention, using a single screw Brabender* extruder equipped with a 1.9 cm mixing screw; The temperature settings for the various zones of the extruder varied from 200° C. to 220° C. The throughput was about 20 g/min. and the melt temperature was about 250° C. The product obtained had a melt index of 0.45 dg/min. and 52% of the maleic anhydride had been grafted. Adhesion to aluminum was 325 g/cm, compared with essentially no adhesion for the ungrafted polymer. There was little or no discolouration of the polymer as a result of the process.

* denotes trade mark

EXAMPLE II 308 g of SCLAIR 114 polyethylene that had been coated with Lupersol 130 organic peroxide, and 12 kg of SCLAIR 19C polyethylene, an ethylene homopolymer having a density of 0.956 g/cm³ and a melt index of 1.0 dg/min, were admixed with 120 g of maleic anhydride power in a Henschel* mixer until the temperature of the polymer had reached 70° C. The concentrations of peroxide and maleic anhydride in the coated product were 50 ppm and 1%, respectively.

* denotes trade mark

The admixture obtained was extruded, according to the process of the invention, through a twin screw extruder, using a melt temperature of 244° C.; the temperature settings for the various zones of the twin screw extruder varied from 100° C. to 210° C. 80% of the maleic anhydride was grafted onto the polymers which had a melt index, after the grafting process, of 0.48 dg/min. The adhesion to aluminum was 540 g/cm, compared with essentially no adhesion for the ungrafted polymer.

EXAMPLE III

The procedure of Example II was repeated using a peroxide concentration of 200 ppm and a melt temperature in the extruder of 265° C.; the temperature settings for the various zones of the twin screw extruder varied from 150° C. to 210° C. 90% of the maleic anhydride was grafted and the resultant polymer had a melt index of 0.23 dg/min. The adhesion to aluminum was 450 g/cm, compared with essentially no adhesion for the ungrafted polymer.

EXAMPLE IV

The procedure of Example II was repeated except that the major polymer was SCLAIR 11K-1 polyethylene. The resultant product contained 0.56% maleic anhydride i.e. 56% grafted, and a melt index of 0.53 dg/min; the temperature settings for the various zones of the twin screw extruder varied from 180° C. to 200° C. The adhesion to aluminum was 720 g/cm, compared essentially no adhesion for the ungrafted polymer.

EXAMPLE V

Three admixtures were prepared in a Waring* blender from 100 g of powdered SCLAIR 11K-1 polyethylene, 25 g of powdered SCLAIR 2114 polyethylene previously coated with 2500 ppm of Lupersol 130 organic peroxide and 1.25 g (1% by weight) of 4-vinyl pyridine. The mixing time used was about two minutes.
* denotes trade mark The combined admixtures were extruded using the procedure of Example I. The product obtained had a melt index of 1.9 dg/min. and contained 0.7% of grafted 4-vinyl pyridine; a melt blended admixture of SCLAIR 11K-1 and SCLAIR 2114 polyethylenes had a melt index of 2.2 dg/min.

EXAMPLE VI 100 g of a concentrate of Lupersol 130 organic peroxide and maleic anhydride were dry blended with 900 g of SCLAIR 11K-1 polyethylene. The concentrate had been prepared by evaporating a solution of the organic peroxide and maleic anhydride in acetone in the presence of powdered SCLAIR 2114 polyethylene. The concentration of organic peroxide and maleic anhydride in the concentrate were 2000 ppm and 5%, respectively; thus the concentrations in the admixture with SCLAIR 11K-1 polyethylene were 200 ppm and 0.5%, respectively. The admixture was extruded using the procedure of Example I.

When pellets of SCLAIR 11K-1 polyethylene were used, the grafted polymer contained 0.17% of maleic anhydride and had a melt index of 0.8 dg/min; the adhesion to aluminum was 251 g/cm. When powdered polyethylene was used, the grafted polymer contained 0.19% maleic anhydride and had a melt index of 0.7 dg/min; the adhesion to aluminum was 387 g/cm.

EXAMPLE VII

Physical admixtures of SCLAIR 11K-1 ethylene/butene-1 copolymer, organic peroxide and maleic anhydride were prepared.

The organic peroxide (Peroxide Concentrate) was in the form of pellets of a composition of SCLAIR 2114 polyethylene, with 4000 ppm of Lupersol 130 organic peroxide and 4000 ppm of DIAK-7* triallyl isocyanurate. The maleic anhydride was either in the form of a powder or a blend in polyethylene, as shown below.
* denotes trade mark The physical admixture was fed, according to the present invention, to a 1.9 cm Brabender single screw extruder and extruded into a strand using a melt temperature of 225° C.

Adhesion tests were conducted by melting the chopped strand between sheets of aluminum at a temperature of 180° C., pressing the sheets together for about 5 seconds and then cooling.

Further details and the results obtained are as follows:

| Sample | A | B | C | D |
| --- | --- | --- | --- | --- |
| SCLAIR 11K-1 copolymer (g) | 1473 | 1331 | 1331 | 1331 |
| Peroxide Concentrate | 18.75 | 18.75 | 18.75 | 18.75 |
| Maleic anhydride** | | | | |
| Powder (g) | 7.5 | — | — | — |

-continued

| Sample | A | B | C | D |
| --- | --- | --- | --- | --- |
| concentrate #1 (g) | — | 150 | — | — |
| concentrate #2 (g) | — | — | 150 | 150 |
| Results | | | | |
| Graft (as anhydride plus acid) (%) | 0.35 | 0.31 | 0.24 | 0.28 |
| Melt Index (dg/min.) | 0.44 | 0.64 | 0.72 | 0.89 |
| Adhesion*** | 3 | 2 | 1 | — |

**In Sample A, the maleic anhydride was in the form of a powder;
In Sample B, the maleic anhydride was in the form of maleic anhydride deposited on ground SCLAIR 2114 polyethylene from the melt in a rotary evaporator (Concentrate #1, which contained about 5% by weight of maleic anhydride);
In Sample C, the maleic anhydride was in the form of maleic anhydride deposited onto ground SCLAIR 2114 polyethylene by evaporation of a solution at 60–65° C. in a rotary evaporator followed by application of a vacuum and cooling to ambient temperature.
In Sample D, maleic acid was used instead of maleic anhydride.
***Estimated order of strength of adhesion (1 = best). The adhesion obtained with Sample A was poor.

EXAMPLE VIII

As a comparison, 32 g of pellets of SCLAIR 11K-1 ethylene/butene-1 copolymer were heated, with stirring, in a Brabender-Plasticorder at 125° C. for 5 minutes. A mixture of dicumyl peroxide and maleic anhydride powder (0.41 g, 1.26%) was then added to the copolymer; four different levels of dicumyl peroxide were used, as shown below. The resultant admixture was blended for 1.5 minutes. The temperature was then raised to 165° C. and maintained at that temperature for a further 10 minutes. The molten graft polymer thus obtained was then removed from the Pasticorder and cooled.

The results obtained were as follows:

| Run | Peroxide (ppm) | Melt Index of Graft Polymer* | Graft Content (MA, wt %)** | Adhesion*** |
| --- | --- | --- | --- | --- |
| 1 | 50 | 1.14 | 0 | poor |
| 2 | 200 | 0.63 | 0.11 | 3 |
| 3 | 500 | 0.20 | 0.10 | 2 |
| 4 | 1000 | 0.04 | 0.12 | 1 |

*in dg/min. The melt index of SCLAIR 11K-1 copolymer is 1.4 dg/min.
**MA = maleic anhydride
***determined using procedure of Example VII. The estimated order of the peel strength is reported (1 = best). The adhesion for Run 4 was poorer than that obtained with the graft polymer of Example I, and the polymer of Run 4 exhibited brittleness.

EXAMPLE IX

In a comparative experiment, maleic anhydride (1%) was coated onto pellets of SCLAIR 11K-1 polyethyleen in an Henschel mixer and heated until the maleic anhydride melted. 200 ppm of Lupersol 130 organic peroxide was injected directly into the Henschel mixer and admixed for one minute. The resultant coated pellets were fed to a single screw Brabender extruder equipped with a 1.9 cm mixing screw and extruded using the procedure of Example I.

The melt index of the grafted polymer was 0.36 dg/cm and the adhesion to aluminum was only 47 g/cm.

This example illustrates a process that does not use a second polymer as in the present invention.

We claim:

1. A continuous process for the grafting onto a polyolefin of an ethylenically unsaturated monomer that is capable of reacting with said polyolefin in a molten condition, said polyolefin being selected from the group consisting of homopolymers of ethylene and copolymers of ethylene and $C_4$-$C_{10}$ higher alpha-olefins, and mixtures thereof, said process comprising:

(i) feeding a physical admixture to an extruder equipped with a mixing screw, said physical admixture being comprised of (a) a major portion of particles of a polyolefin, (b) a minor portion of particles of a second polymer, (c) said monomer and (d) 125–400 ppm of an organic peroxide having a half life of from about one minute to about 120 minutes at 150° C., said polyolefin being the polyolefin defined above and said second polymer being a normally solid thermoplastic polymer selected from the group consisting of:

(A). homopolymers and copolymers consisting of unsaturated hydrocarbons;

(B). copolymers of an alpha-olefin having the formula $R$—$CH$=$CH_2$, wherein R is a radical selected from the class consisting of hydrogen and alkyl radicals having from 1 to 8 carbon atoms, with alpha,beta-ethylenically unsaturated acids having from 3 to 8 carbon atoms, and esters and anhydrides thereof, such acids being mono-, or di- or polycarboxylic acids, the moieties being randomly or non-randomly distributed in the polymer chain and being 0.5–50% by weight of the copolymer, any other copolymerized monomer being monoethylenically unsaturated;

(C). ionomeric polymers derived from the copolymers of (B);

(D). graft copolymers obtained by grafting 0.1 to 5 percent by weight of alpha-beta unsaturated carboxylic acids having 3 to 8 carbon atoms or an unsaturated carboxylic acid anhydride onto a preformed backbone derived from ethylene or ethylene and $C_3$ to $C_8$ alpha-olefin, in which polyolefin backbone any other optionally copolymerized monomer component is monoethylenically unsaturated;

(E). homopolymers of $R'$—$CH$=$CH$—$R'$ were each R' is independently selected from the group consisting of H, Cl and F, with the proviso that at least one R' is other than H, copolymers of ethylene with $R'$—$CH$=$CH$—$R'$ and chlorinated homopolymers and copolymers of $C_2$-$C_{10}$ hydrocarbon alpha-olefins;

(F). saturated polyamides and polyesters;

(G). homopolymers of vinyl esters of aliphatic carboxylic acids having 3 to 8 carbon atoms, copolymers of ethylene with such esters, and partially saponified polymers thereof; and (H). copolymers of (B) in which all or part of the alpha-olefin has been replaced with styrene or alkyl styrene, where the alkyl group has 1 or 2 carbon atoms, and having a meltin point of less than 185° C/ and a shear viscosity that is not more than 50% of that of said polyolefin when measured at 200° C. and a shear rate of 400 $sec^{-1}$, said organic peroxide being in the form of a composition with the second polymer, (ii) mixing said admixture in the extruder at a temperature in the range of from the melting point of said polyolefin to 195° C. for a period of time such that the amount of decomposition of the organic peroxide is less than about 25%, said period of time being at least ten seconds, (iii) mixing the resultant admixture in a second zone of the extruder at a temperature above the melting point of the polyolefin and second polymer for a period of time that is at least four times the half-life of the peroxide, and (iv) extruding the grafted polymer so obtained into a shaped article.

2. The process of claim 1 in which the monomer is selected from the group consisting of ethylenically unsaturated carboxylic acids, ethylenically unsaturated carboxylic acid anhydrides, and mixtures thereof.

3. The process of claim 2 in which the temperature of the admixture in the second zone of the extruder is higher than the temperature of the admixture in the first zone of the extruder.

4. The process of claim 3 in which, in step (iii), the temperature of the admixture is in the range of 195°–280° C.

5. The process of claim 4 in which the ratio of the polyolefin to the second polymer is in the range of 5:1 to 400:1.

6. The process of claim 5 in which the second polymer is a polymer of (A).

7. The process of claim 5 in which the second polymer is a polymer of (B).

8. The process of claim 5 in which the second polymer is a polymer of (C).

9. The process of claim 5 in which the second polymer is a polymer of (D).

10. The process of claim 5 in which the second polymer is a polymer of (E).

11. The process of claim 5 in which the second polymer is a polymer of (F).

12. The process of claim 5 in which the second polymer is a polymer of (G).

13. The process of claim 5 in which the second polymer is a polymer of (H).

14. The process of claim 6 in which the second polymer is selected form the group consisting of homopolymers of ethylene and copolymers of ethylene and at least one $C_4$-$C_{10}$ higher alpha-olefin, and mixtures thereof.

15. The process of claim 14 in which the shear viscosity of the second polymer is not more than 30% of that of the polyolefin.

16. The process of claim 15 in which the shear viscosity of the second polymer is 5–15% of that of the polyolefin.

17. The process of claim 14 in which the amount of organic peroxide is 25–400 ppm.

18. The process of claim 14 in which the amount of organic peroxide is 50–200 ppm.

19. The process of claim 5 in which the hold-up time of the admixture in the extruder is less than two minutes.

20. The process of claim 5 in which the monomer is maleic anhydride.

21. The process of claim 14 in which the ratio of the polyolefin to the second polymer is in the range of 10:1 to 100:1.

22. The process of claim 14 in which the organic peroxide is 2,5-dimethyl-2,5-di(t-butylperoxy)hexyne-3.

23. The process of claim 20 in which the amount of monomer is 0.1–2% by weight of the admixture.

24. The process of claim 14 in which, in step (iii), the temperature is in the range of 210°–260° C.

* * * * *

UNITED STATES PATENT AND TRADEMARK OFFICE
CERTIFICATE OF CORRECTION

PATENT NO. : 4,612,155
DATED : September 16, 1986
INVENTOR(S) : Chun S. Wong; Ronald A. Zelonka It is certified that error appears in the above—identified patent and that said Letters Patent is hereby corrected as shown below:

In Claim 1 at column 11, line 8, the range "125-400 ppm" should read -- 25-400 ppm --.

Signed and Sealed this

Twenty-fourth Day of March, 1987

*Attest:*

DONALD J. QUIGG

*Attesting Officer*  *Commissioner of Patents and Trademarks*